United States Patent
Hall

(10) Patent No.: US 7,457,311 B2
(45) Date of Patent: Nov. 25, 2008

(54) PORTABLE COMMUNICATION INTERFACE DEVICE

(75) Inventor: Erik M. Hall, Palmetto, FL (US)

(73) Assignee: Honeywell International Inc., Morristown, NJ (US)

( * ) Notice: Subject to any disclaimer, the term of this patent is extended or adjusted under 35 U.S.C. 154(b) by 849 days.

(21) Appl. No.: 10/930,969

(22) Filed: Aug. 31, 2004

(65) Prior Publication Data

US 2006/0045127 A1    Mar. 2, 2006

(51) Int. Cl.
*H04J 3/22*    (2006.01)

(52) U.S. Cl. .................... 370/466; 702/108; 710/71; 710/72

(58) Field of Classification Search ........... 370/241, 370/465, 466, 467; 389/51; 705/401; 710/71, 710/72; 702/108
See application file for complete search history.

(56) References Cited

U.S. PATENT DOCUMENTS

| | | | |
|---|---|---|---|
| 4,041,473 A | | 8/1977 | Bardotti et al. |
| 4,535,421 A | * | 8/1985 | Duwel et al. .................. 710/71 |
| 4,837,714 A | * | 6/1989 | Brookner et al. ............. 702/108 |
| 5,737,426 A | * | 4/1998 | Brookner et al. ............... 380/51 |
| 6,076,081 A | * | 6/2000 | Bass et al. .................. 705/401 |
| 6,172,617 B1 | | 1/2001 | Bullock |
| 6,317,804 B1 | | 11/2001 | Levy et al. |
| 6,343,260 B1 | | 1/2002 | Chew |
| 6,378,012 B1 | * | 4/2002 | Bass et al. .................... 710/72 |
| 6,429,812 B1 | | 8/2002 | Hoffberg |
| 6,516,053 B1 | | 2/2003 | Ryan et al. |
| 6,516,272 B2 | | 2/2003 | Lin |
| 6,615,299 B1 | | 9/2003 | Chu et al. |
| 6,651,229 B2 | | 11/2003 | Smith et al. |
| 6,664,945 B1 | | 12/2003 | Gyde et al. |
| 6,678,747 B2 | | 1/2004 | Goossen et al. |
| 2003/0193404 A1 | | 10/2003 | Joao |
| 2003/0236601 A1 | | 12/2003 | McLeod et al. |

FOREIGN PATENT DOCUMENTS

EP    0717377    6/1996

OTHER PUBLICATIONS

DLP Design, DLP-245PB, USB / Microcontroller Module, http://www.dlpdesign.com, available prior to Aug. 31, 2004, pp. 1-15, Publisher: DLP Design.

* cited by examiner

*Primary Examiner*—Chi H. Pham
*Assistant Examiner*—Albert T Chou
(74) *Attorney, Agent, or Firm*—Black Lowe & Graham, PLLC

(57) ABSTRACT

The present inventions relate to portable communication interface devices for communication and testing between a computer and electronic devices The portable communication interface device of one embodiment includes at least one specialized port, a standard port and a controller. Each specialized port is adapted to selectively communicate with an associated electronic device wherein each associated electronic device communicates by a unique device format. The standard port is adapted to selectively communicate with a computer wherein the computer is communicating by a computer format. The controller is coupled between the one or more specialized ports and the standard port. The controller is adapted to provide an interface between each unique device format and the computer format. The controller includes a data processor that is adapted to perform logic conversions.

9 Claims, 5 Drawing Sheets

PORTABLE COMMUNICATION INTERFACE DEVICE

TECHNICAL FIELD

The following description relates to interface devices, and more particularly to a portable communication interface device for communication and testing between a computer and electronic devices.

BACKGROUND

Modern electronics devices implement a vast array of differing interfaces. In many applications, such as military applications, proprietary and custom customer-specified interfaces are common. Testing and monitoring of data transferred over such specialized, proprietary, or otherwise non-standard interfaces can be costly and difficult. When data over a particular interface cannot be tested and monitored with commercial off the shelf (COTS) test equipment, either specialized test equipment must be built, or standard COTS test equipment must be modified. Numerous modifications are necessary to a plurality of test equipment devices for some applications when a COTS approach is chosen. When specialized test equipment is to be used, the equipment must first be designed and manufactured, both of which require time and money. This specialized test equipment generally can perform only those tests specified at the time of manufacture, and are not adaptable to future testing needs.

SUMMARY

The above-mentioned problems and other problems are resolved by the present invention and will be understood by reading and studying the following specification.

In one embodiment a communication interface device comprises one or more specialized ports, a standard port and a controller. Each specialized port is adapted to selectively communicate with one or more associated electronic devices. Each of the one or more associated electronic devices communicates with a unique device format. The standard port is adapted to selectively communicate with a computer. The computer communicates with a computer format. The controller is in communication with the standard port and the one or more specialized ports. Moreover, the controller is adapted to provide an interface between each unique device format and the computer format. The controller, the at least one specialized port and the standard port being housed in a portable unit.

In another embodiment, a portable communication interface device in disclosed. The portable communication interface device includes at least one specialized port, a standard port, a memory and a controller. The at least one specialized port is adapted to selectively communicate with at least one electronic device using a unique device format. The standard port is adapted to selectively communicate with a computer using a computer format. The memory is adapted to selectively store communication signals received at the at least one specialized port and at the standard port. The controller is in communication with the standard port and the at least one specialized port. Moreover, the controller is adapted to interface signals between the computer format and the unique format. The controller is further adapted to selectively interface communication signals stored in the memory.

In yet another embodiment, a portable communication interface device is disclosed. The portable communication interface device includes at least one specialized port, a standard port and a controller. Each specialized port is adapted to selectively communicate with an associated electronic device wherein each associated electronic device communicates by a unique device format. The standard port is adapted to selectively communicate with a computer wherein the computer is communicating by a computer format. The controller is coupled between the one or more specialized ports and the standard port. The controller is adapted to provide an interface between each unique device format and the computer format. The controller includes a data processor that is adapted to perform logic conversions.

In another embodiment, a communication system is disclosed. The communication system includes a computer, at least one electronic device and a portable communication interface device. The portable communication interface device includes at least one specialized port, a standard port and a controller. The at least one specialized port is adapted for selective communication with one or more electronics devices wherein each electronic device communicates via unique device format. A standard port adapted for selective communication with the computer wherein the computer communicates via computer format. The controller is coupled to the standard port and the at least one specialized port. The controller is adapted to interface between the unique device format and the computer format.

In still another embodiment, a method for interfacing a computer to an electronic device is disclosed. The method comprises coupling one or more electronic devices to one or more associated device ports of a portable communication interface device. Coupling a computer port of the portable communication interface device to a computer. Receiving one or more input signals from the one or more electronic devices over the one or more device ports, each of the one or more input signals having a first data rate and a first data format. Converting the one or more input signals into one or more converted input signals having a second data format and a second data rate and sending the one or more converted signals over the computer port to the computer.

In yet another embodiment, a computer-readable medium having computer-executable instructions for performing a method is disclosed. The computer-executable instructions include storing data signals having a first date rate and a first data format received via first port. Retrieving the data signals when a second port is coupled to a communication link. Converting the data signals from the first data rate and first data format to a second data rate and a second data format and applying the converted data signals to the second port.

In further yet another embodiment, a method for testing and monitoring one or more electronic devices is disclosed. The method comprising coupling a communication interface device to one or more electronic devices, wherein the communication interface device is connected to the one or more electronic devices through one or more device communication links. Receiving one or more input signals from the one or more electronic devices over the one or more device communication links, wherein each of the one or more input signals has a data format and a data rate and performing at least one of interpreting the one or more input signals and storing the one or more input signals.

In another embodiment, a method for testing an electronic device is disclosed. The method comprises coupling a communication interface device to an electronic device through one or more device communication links. Receiving one or more input signals from the electronic device over the one or more device communication links, wherein each of the one or more input signals has a first data format and a first data rate. Storing the one or more input signals in onboard memory.

Detaching the communication interface device from the electronic device. Coupling the communication interface device to a computer through a computer communication link. Converting the one or more stored input signals into one or more converted input signals, wherein the one or more converted input signals have a second data format and a second data rate and sending the one or more converted input signals to the computer over the computer communication link.

In another embodiment, a method for updating electronic devices is disclosed. The method comprises coupling a communication interface device to a computer through a computer communication link. Receiving one or more output signals from the computer over the computer communication link, wherein the computer communication link has a first data format and a first data rate. Storing the one or more output signals in onboard memory. Detaching the communication interface device from the computer. Coupling the communication interface device to one or more electronic devices through one or more device communication links. Converting the one or more stored output signals into one or more converted output signals, wherein the one or more converted output signals have a second data format and a second data rate and sending the one or more converted output signals to the one or more electronic devices over the one or more device communication links.

In still another embodiment, a method of translating between communication formats is disclosed. The method comprises receiving a communication signal having a first data rate and a first data format on a first port. Storing the communication signal in a memory. Coupling a communication link to a second port, the second port adapted to receive and transmit communication signals having a second data rate and second data format. Retrieving the communication signal from memory. Translating the communication signal from the first data rate and first data format to the second data rate and second data format and coupling the translated communication signal to the second port.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

The primary embodiments of the invention will now be discussed in detail, examples of which are illustrated in the accompanying figures. Illustrated embodiments are presented by way of example and are not to be construed as limitations. All alternatives, modifications, and equivalents that fall within the scope and spirit of the invention are incorporated herein. For example, it is understood by a person of ordinary skill in the art that while the present invention only discusses certain components of, for example, controllers, controllers comprise an abundance of components, whose functions are not necessary to describe for understanding.

This description is presented with enough detail to provide an understanding of the present invention, and should not be construed to encompass all necessary steps in the manufacture or use of test equipment and communication interfaces.

Figure 1:
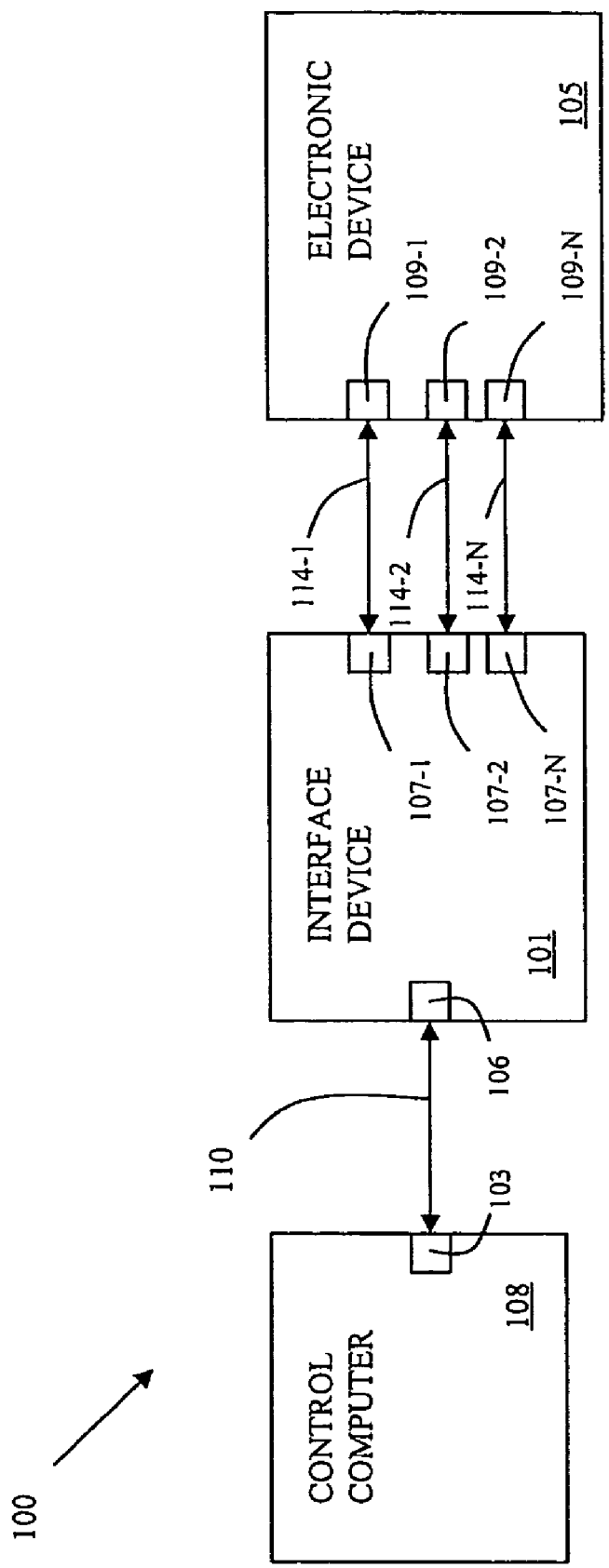
FIG. 1 is a block diagram of a communication network in accordance with one embodiment of the present invention.

Referring more particularly to the drawings, FIG. 1 shows a block diagram of a communication network, shown generally at 100, in accordance with one embodiment of the present invention. In the illustrated embodiment, the communication network 100 comprises a control computer 108, a portable communication interface device 101, and an electronic device 105. In alternative embodiments, the electronic device 105 comprises a plurality of electronic devices. The portable communication interface device 101 is coupled to the control computer 108 through a computer communication link 110 and to the electronic device 105 through one or more device communication links 114-1 to 114-N. In certain embodiments the computer communication link 110 is attached to a control computer standard port 103 of the control computer 110 and to an interface device standard port 106 of the interface device 101. Similarly, in certain embodiments the one or more device communication links 114-1 to 114-N are connected to interface device specialized ports 107-1 to 107-N of the interface device 101 and to electronic device specialized ports 109-1 to 109-N of the electronic device 105. In some embodiments the one or more device communication links 114-1 to 114-N comprise one or more specialized communication links.

Specialized communication links are specialized interfaces such as custom-built interfaces that are unique to a particular project or application. One example of an industry that commonly uses specialized interfaces is the military. Specialized interfaces can take different forms, have differing data rates, and communicate using various unique communication protocols (data formats). Examples of specialized interfaces include Mil-1553 interfaces, RS422 interfaces, and the like. Mil-1553 interfaces are balanced (differential) interfaces that comprise a multiplex data bus system that functions asynchronously in a command and response mode, and over which transmission occurs in a half-duplex manner. Mil-1553 interfaces generally communicate at a transmission bit rate of 1 Mbit/s. RS422 interfaces are balanced voltage digital interface circuits that are normally utilized on data, timing, and control circuits where the data signaling rate is up to 10 Mbit/s. RS422 interfaces communicate using differential drivers on balanced or unbalanced circuits.

In certain embodiments, the electronic device 105 comprises a navigation device, and the one or more device communication links 114-1 to 114-N comprise one or more specialized navigation interfaces. Navigation devices share the requirement of extremely precise time stamping of data. This extremely precise time stamped data is communicated over the specialized navigation interfaces at particular data rates. Test equipment must be capable of communicating accurately at those particular data rates, without deviating from the necessary time stamp.

Use of the portable communication interface device 101 for connecting the electronic device 105 to the control computer 108 is advantageous in that it assures proper communication, such as at particular data rates. For many applications, the control computer 108 does not include proper connectors for coupling directly to the electronic device 105. Where the proper connectors do exist on the control computer 105, for certain applications and interfaces the control computer 105 is not capable of communicating at the necessary data rate, or under the appropriate communication protocol. In these situations, as in others, the portable communication interface device 101 advantageously couples to both the electronic device 105 and the control computer 108.

Figure 2:
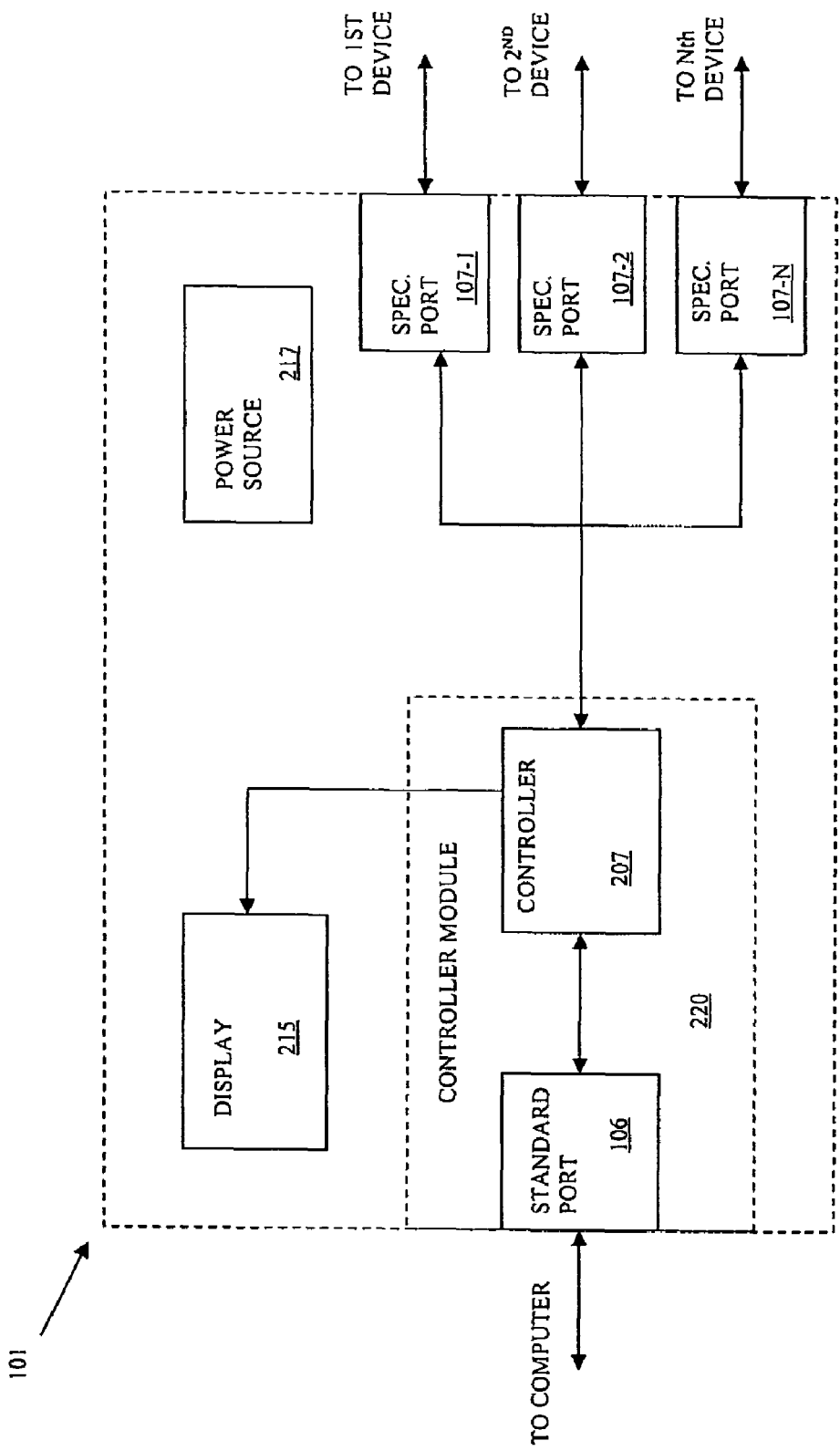
FIG. 2 is a block diagram of a portable communication interface device in accordance with one embodiment of the present invention.

FIG. 2 illustrates a block diagram of the portable communication interface device 101 in accordance with one embodiment of present invention. In one embodiment, the portable communication interface device 101 comprises an interface device standard port 106, a controller 207, at one or more interface device specialized ports 107-1 to 107-N, a display 215, and a power source 217. In one embodiment the controller 207 includes a data processor adapted to perform test functions. Test functions are used to test electronic devices coupled to the at least one specialized interface circuit. For example, in one embodiment, a test for configuration verification is used. In this embodiment, the interface device 101 is use to probe a unit under test (UUT) to check for proper configuration values. If the controller 207 of the interface device 101 finds certain values expected to not be present, or incorrect, the correct values are loaded into the UUT automatically. In another embodiment, functional verification testing is provided. In this embodiment, the interface device 101 sends pre-loaded messages to the UUT and then verifies the UUT's response. Moreover, the response can be stored in the controller to be later retrieved and analyzed by a computer 108 that is subsequently coupled to the standard port 106. In further another embodiment, the interface device is adapted to provide software upgrades. In this embodiment, the software upgrades from the computer 108 are stored in memory in the interface device and when a device is subsequently coupled to a select specialized port 107, the software upgrade is downloaded to the device.

In certain embodiments the standard interface circuit comprises a USB interface circuit. In one embodiment the standard interface circuit comprises an FTDI FT245BM USB interface circuit, the controller comprises a PICF877 microcontroller, and the at least one specialized interface comprises at least one RS422 Transceiver. In one embodiment, the interface device standard port 106 and the controller 207 are coupled to and integrated into a microcontroller module 220. In one embodiment the microcontroller module comprises a DLP-245PB. Data is received by the one or more interface device specialized ports 107-1 to 107-N from the one or more device communication links 114-1 to 114-N and sent to the controller 207. Received data is communicated under a particular data format and at a particular data rate. In certain embodiments, the data format and data rate are individualized for communication with a particular electronic device 105. The controller 207 interprets the data, and sends it to the interface device standard port 106. In one embodiment, data sent to the interface device standard port 106 comprises at least one of a different communication protocol and a different data rate than the communication protocol and the data rate of the received data. The interface device standard port 106 sends the interpreted data to the control computer 108 through the computer communication link 110. In one embodiment the computer communication link 110 is an interface selected from a list comprising serial RS232 ports, parallel ports, SCSI interfaces, USB 1.0 and USB 2.0 interfaces, Ethernet, and firewire interfaces. The interpreted data is received by the control computer 108 and processed and analyzed by a test program installed on the control computer 108. In certain embodiments, interpreted data is also output at display 215. In one embodiment the portable communication interface device 101 is powered by a power source 217. In alternative embodiments, the portable communication interface device 101 is powered through the computer communication link 110.

Figure 3:
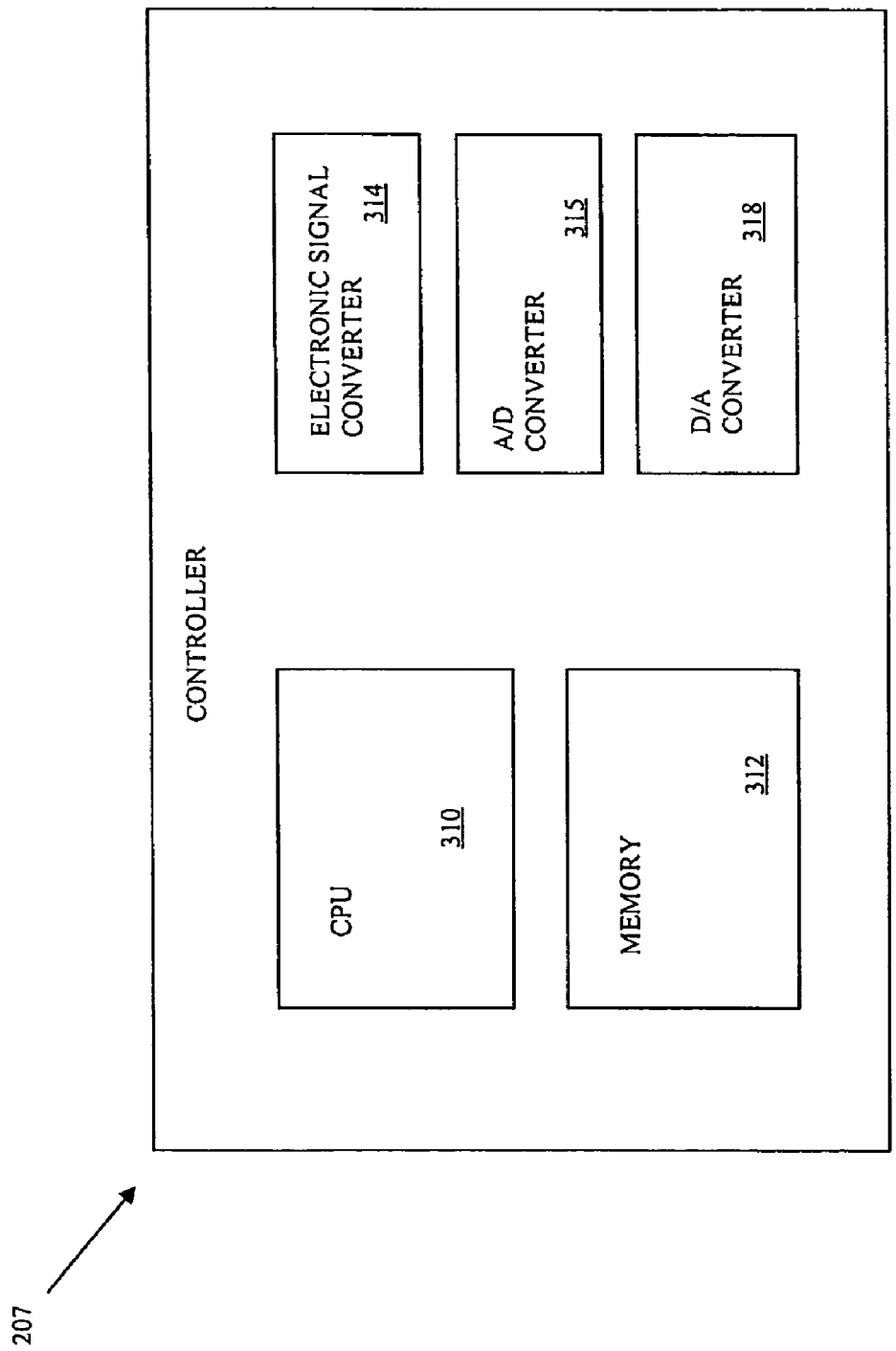
FIG. 3 is a conceptual block diagram of a controller in accordance with one embodiment of the present invention.

FIG. 3 shows a conceptual block diagram of a controller 207 in accordance with one embodiment of the present invention. In the illustrated embodiment, the controller 207 comprises a CPU 310, onboard memory 312, an electronic signal converter, an analog to digital (A/D) converter 315, and a digital to analog (D/A) converter 318. In certain embodiments programs are stored in the onboard memory 312 and executed by the CPU 310. In these embodiments connection to a control computer 108 is unnecessary. For example, in one embodiment the controller 207 is programmed to monitor and store data received via the one ore more interface device specialized ports 107-1 to 107-N on the onboard memory 312. Data is received from electronic device 105 through the one or more device communication links 114-1 to 114-N, the one or more interface device specialized ports 107-1 to 107-N, and stored in the onboard memory 312. After data has been stored, the portable communication interface device 101 is detached from the electronic device 105. The portable communication interface device 101 is subsequently connected to a control computer 108 through the computer communication link 110 and interface device standard port 106 and the stored data is input to the control computer 108. In this manner, data gathering and data analyzing is executed at different periods, and can be executed at different sites.

The A/D converter 315 and D/A converter 318 are implemented where the one or more device communication links 114-1 to 114-N communicate with a data format that comprises analog data. For embodiments in which one or more device communication links 114-1 to 114-N comprise at least one analog interface, the A/D converter converts received analog data into digital data before sending to controller 207. When controller 207 sends data to electronic device 105 over the analog interface, D/A converter receives digital data from the controller 207 and converts it to analog data before sending. The electronic signal converter 314 is adapted to change the transmission method of the signal for conversion. For example, the electronic signal converter 314 may be a RS422 converter which converts 0-5V logic signals from the CPU 310 into balanced signal pairs suitable for use by the specialized electronic devices. With the electronic signal converter 314, the voltage is changed but not the content of the signal. Logic conversion takes place in the CPU 310. In particular, the CPU is adapted to change the content of select signals passing through the interface device. For example, the logic conversion of the CPU allows for the interface between data in two completely different formats. The CPU 310 can generally be referred to as a "processor". In one embodiment, the processor is programmed to time stamp data received from specialized electronic devices. Further in another embodiment, the time stamps are passed along with the data to a computer (such as control computer 108 of FIG. 1) for analysis.

Figure 4:
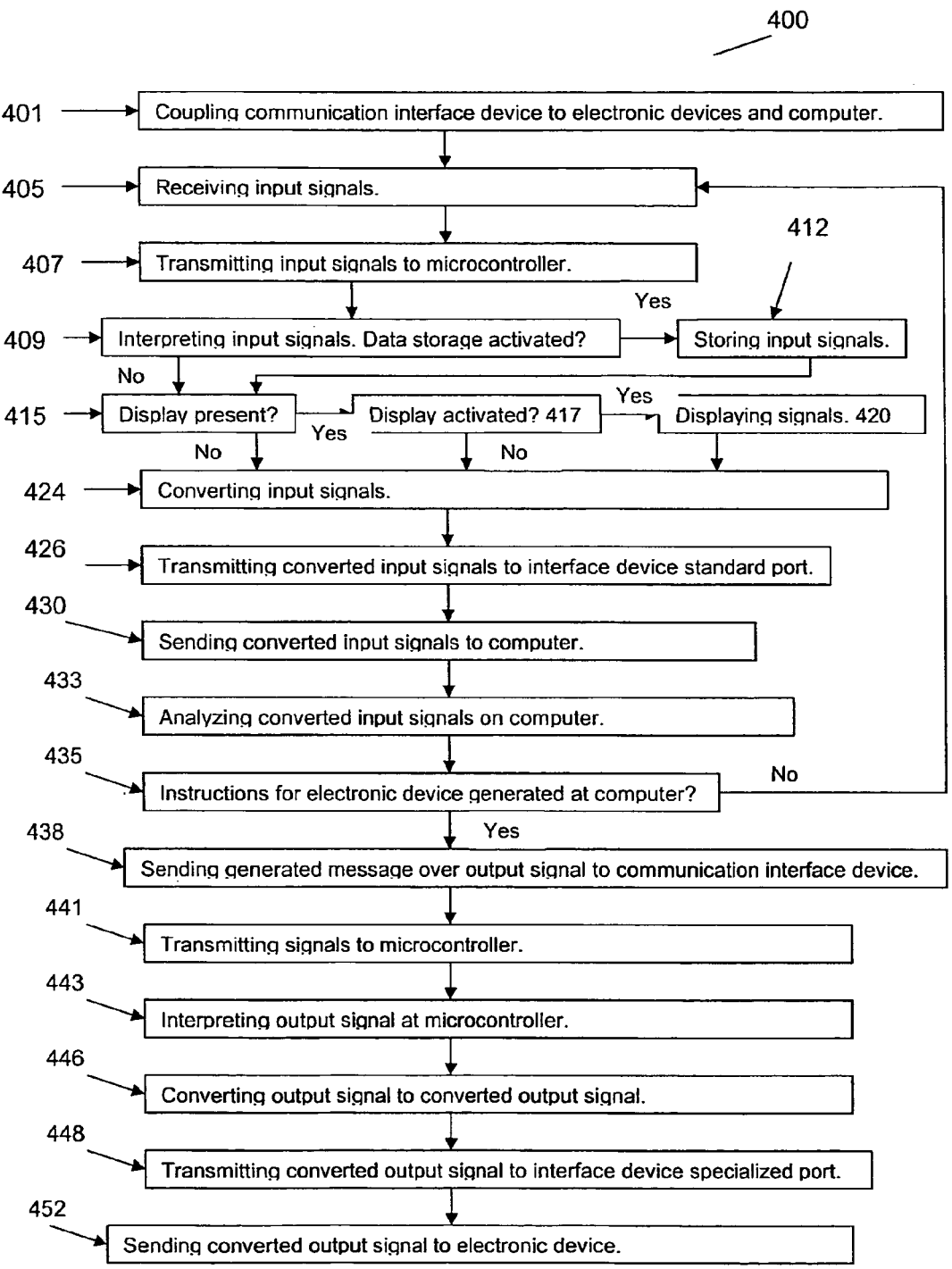
FIG. 4 is a flow chart of a method for interfacing a computer to an electronic device in accordance with one embodiment of the present invention.

FIG. 4 shows a flow chart depicting a method for interfacing a control computer to an electronic device, shown generally at 400, in accordance with one embodiment of the present invention. The method begins by coupling a portable communication interface device to one or more electronic devices and to a computer, such as a personal computer (PC) (401). The portable communication interface device is connected to the one or more electronic devices through one or more device communication links, and to the PC through a computer communication link. One or more input signals are received at one or more interface device specialized ports of the portable communication interface device from the one or more electronic devices over the one or more device communication links (405). The one or more input signals each have a first data format and a first data rate. Subsequently, the one or more input signals are transmitted to a controller of the portable communication interface device (407). The controller interprets the one or more input signals (405). When data storage is activated, the at least one input signal is stored in onboard memory (412).

After storing the one or more input signals, or when data storage is not activated, the controller next queries whether or not a display is present (415). When a display is present, the controller queries whether or not the display is activated (417). When the display is activated, signals, such as the one or more input signals, are output at the display (420). Subsequently, whether signals have been output at a display or not, the controller converts the one or more input signals to a converted input signal or multiple converted input signals (424). The converted input signal or input signals have a second data format and a second data rate. The converted input signal or converted input signals are transmitted to an interface device standard port of the portable communication interface device (426). The converted input signals are then sent to the control computer over a computer communication link (430). The control computer is programmed to receive, store, and analyze the converted input signals. Once received, the converted input signals are analyzed on the control computer (433). When no instructions are generated at the control computer, the method repeats from step (405). In this manner information is continuously gathered until the interface communication device is disconnected or an instruction is sent to stop gathering data.

When instructions for the one or more electronic devices or for the controller of the portable communication interface device are generated at the control computer, those messages are subsequently sent via an output signal over the computer communication link to the interface device standard port of the portable communication interface device (438). In certain embodiments instructions for electronic devices include, for example, software updates or driver updates. The output signal has the second data format and second data rate. The output signal is subsequently transmitted to the controller (441). The output signal is interpreted at the controller (443) and when necessary converted to a converted output signal (446). It is necessary to convert the output signal into the converted output signal when the instruction is to be sent to one or more electronic device. When the instruction is an instruction for the controller itself, the output signal is not converted. The converted output signal has the first data format and first data rate. After conversion, the converted output signal is transmitted to one of the one or more interface device specialized ports (448). Which interface device specialized port the converted output signal is to be transmitted to is determined at the control computer at the time the output signal is generated. Finally, the converted output signal is sent to the electronic device that is attached to the interface device specialized port to which the converted output signal was transmitted (452). Unless the instruction that was generated at the control computer was a message directed to the controller to stop gathering data, the method then repeats from step (405).

Figure 5:
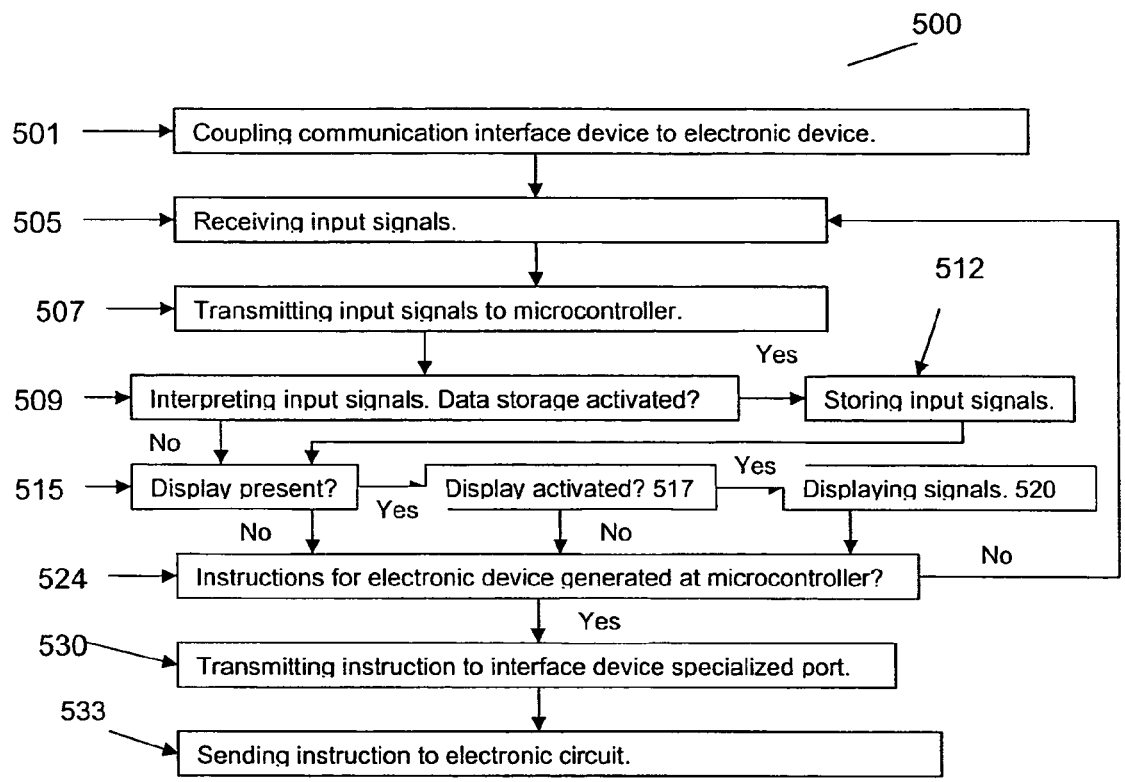
FIG. 5 is a flow chart of a method for testing and monitoring an electronic device in accordance with one embodiment of the present invention.

FIG. 5 illustrates a method for testing and monitoring an electronic device, shown generally at 500, according to one embodiment of the present invention. In accordance with this method, a portable communication interface device is first coupled to an electronics device through a device communication link (501). Input signals are received at an interface device specialized port of the portable communication interface device over the device communication link (505). Those input signals are subsequently transmitted to a controller of the portable communication interface device (507) and interpreted (509). Depending on the software configuration of the controller, interpreting can comprise a variety of actions. For example, in one embodiment interpreting comprises analyzing and generating statistics on input signals. Concurrent to interpreting input signals, the controller queries whether data storage is activated. When data storage is activated, input signals are stored in onboard memory (512). Subsequently, the controller queries whether a display is present (515) and if so, whether the display is activated (517). When a display is both present and activated, signals are output at the display (520). Signals comprise, for example, test results, statistics on the input signals, input signal values, and the like. Next, the controller generates instructions for the electronic device when necessary (524). When no instructions are generated at the controller, the method repeats from step (505). When instructions are generated, those instructions are transmitted to the interface device specialized port via an output signal (530). The output signal is then sent to the electronic device via the device communication link (533). The method repeats from step (505) until, for example, the portable communication interface device is disconnected from the electronics device.

In alternative embodiments, the electronics device comprises a plurality of electronics devices, the device communication link comprises a plurality of device communication links, and the interface device specialized port comprises a plurality of interface device specialized ports. Input signals are received concurrently from each of the plurality of electronics devices that are attached to the portable communication interface device through the plurality of device communication links.

In view of the foregoing, it will be understood by those skilled in the art that the methods of the present invention can be used in conjunction with current computing, electronics interface, and communication techniques. The above embodiments have been presented by way of example and not by way of limitation. Variations and modifications may occur, which fall within the scope of the present invention, as set forth in the following claims.

What is claimed is:

1. A method for testing and monitoring one or more electronic devices comprising:

coupling a communication interface device to one or more electronic devices, wherein the communication interface device is connected to the one or more electronic devices through one or more device communication links;

receiving one or more input signals from the one or more electronic devices over the one or more device communication links, wherein each of the one or more input signals has a data format and a data rate;

performing at least one of interpreting the one or more input signals and storing the one or more input signals;

detaching the one or more electronic devices from the communication interface device;

coupling the communication interface device to a computer through a computer communication link;

converting the one or more stored input signals; and sending the one or more converted input signals to the computer over the computer communication link.

2. The method of claim 1, wherein interpreting the one or more input signals comprises at least one of testing, analyzing, and generating statistics on the one or more input signals at a data processor.

3. The method of claim 1, further comprising:
displaying an output signal.

4. The method of claim 1, wherein displaying an output signal further comprises:
displaying one or more of test results, statistics on input signals, and input signal values.

5. The method of claim 1, further comprising:
generating instructions; and
sending the instructions to one or more electronic devices over the one or more device communication links.

6. A method for testing an electronic device, the method comprising:
coupling a communication interface device to an electronic device through one or more device communication links;
receiving one or more input signals from the electronic device over the one or more device communication links, wherein each of the one or more input signals has a first data format and a first data rate;
storing the one or more input signals in onboard memory;
detaching the communication interface device from the electronic device;
coupling the communication interface device to a computer through a computer communication link;
converting the one or more stored input signals into one or more converted input signals, wherein the one or more converted input signals have a second data format and a second data rate; and
sending the one or more converted input signals to the computer over the computer communication link.

7. The method of claim 6, further comprising:
time stamping the one or more input signals.

8. A method for updating electronic devices, the method comprising:
coupling a communication interface device to a computer through a computer communication link;
receiving one or more output signals from the computer over the computer communication link, wherein the computer communication link has a first data format and a first data rate;
storing the one or more output signals in onboard memory;
detaching the communication interface device from the computer;
coupling the communication interface device to one or more electronic devices through one or more device communication links;
converting the one or more stored output signals into one or more converted output signals, wherein the one or more converted output signals have a second data format and a second data rate; and
sending the one or more converted output signals to the one or more electronic devices over the one or more device communication links.

9. The method of claim 8, wherein the one or more output signals comprise at least one of software updates, driver updates, and firmware updates.

* * * * *